(No Model.)
F. KROHE.
WIRE REEL.
No. 456,577.  Patented July 28, 1891.
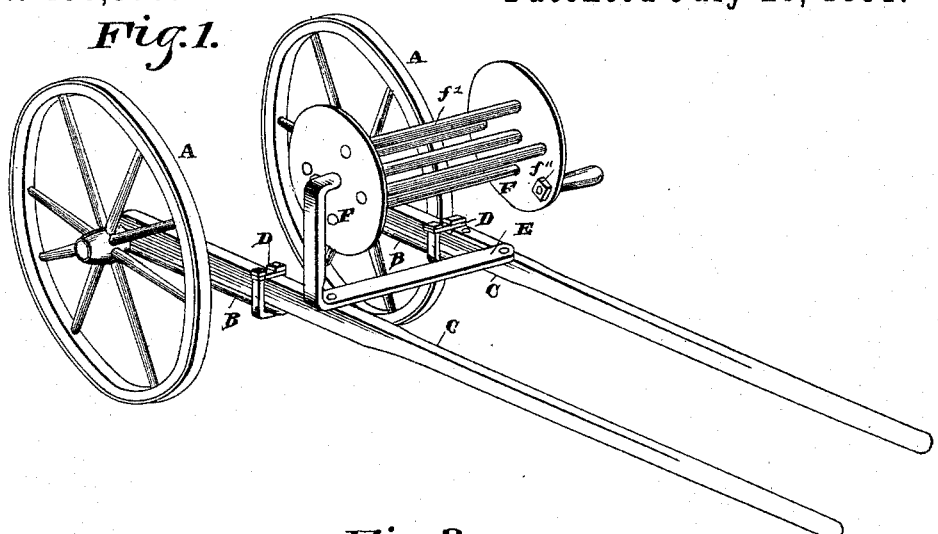
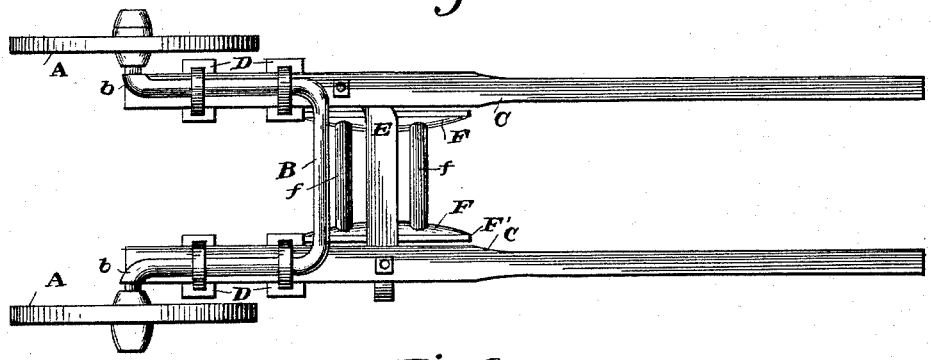
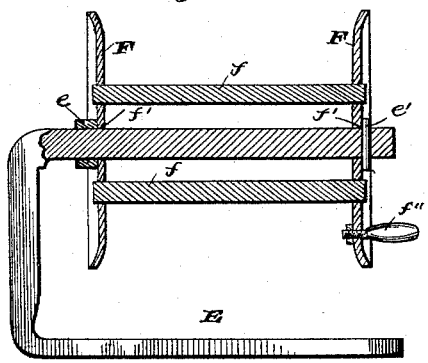
Witnesses
D. S. Obr.
J. M. Saul.
Inventor
Frank Krohe.
By his Attorneys,
C. A. Snow & Co.
THE NORRIS PETERS CO., PHOTO-LITHO., WASHINGTON, D. C.

UNITED STATES PATENT OFFICE.

FRANK KROHE, OF RUSHVILLE, ILLINOIS.

WIRE-REEL.

SPECIFICATION forming part of Letters Patent No. 456,577, dated July 28, 1891.

Application filed December 30, 1890. Serial No. 376,258. (No model.)

*To all whom it may concern:*

Be it known that I, FRANK KROHE, a citizen of the United States, residing at Rushville, in the county of Schuyler and State of Illinois, have invented a new and useful Wire-Reel, of which the following is a specification.

This invention is an improvement in portable wire-reels, and has for its object to provide a reel upon which may be wound either wire of the ordinary smooth kind or barbed wire, either for the purpose of transportation or of storage or for the purpose of constructing wire fences and the like.

The invention has for further objects to provide a wire-reel which is simple of construction, easy of management, and inexpensive of manufacture.

With these objects in view the invention resides in the various novel details of construction and in the combination of parts hereinafter fully described, and particularly pointed out in the claims.

In the drawings in which I have illustrated my invention, and in which like letters of reference indicate corresponding parts, Figure 1 is a perspective view of a device embodying my invention. Fig. 2 is a bottom plan view of the same, and Fig. 3 is a transverse section through the reel.

In the drawings, the letter A designates the wheels which support the frame upon which my reel is carried. These wheels are mounted upon the outwardly-turned ends $b$ of the U-shaped axle B, which is clipped to the handles or shafts C by means of the clip-pieces D. Secured to one of the handles C is one end of the bracket E. This bracket is substantially U-shaped and extends across from one of the handles or shafts C to the other, being secured to both, then rises a suitable distance above its transverse connecting portion, which is attached to the shafts, as before described, and is extended backward parallel to its first direction.

F designates the reel proper, which is journaled upon the upper free arm of the bracket E, and is limited in its movement thereon by any suitable means, such as a collar or pin upon one end, as shown at $e$, and a pin or nut at the other end, as shown at $e'$. The reel F is composed as follows: Two disks F′, which have their outer edges flaring, as shown, are connected by brace-bars $f$, arranged around the centers of the disks, and these centers are perforated or otherwise provided with journal-bearings, as shown at $f'$. One of the disks, the one which is designed to have the outer position upon the free end of the upper arm of the bracket E, is provided with a crank-handle $f''$, either permanently or removably attached thereto, as preferred.

The chief advantages of the construction just described are that by the U-shaped or horizontally-arched axle B two functions are performed—that is, the function proper of an axle and that of a transverse connecting piece or bar uniting the shafts or handles C. This is a great advantage, as by this construction the cost of manufacturing the device is much lessened, the device itself is simplified, and the strength of the parts increased. Besides all this, as utility and simplicity in mechanical structures contribute to their beauty, the appearance of the device is improved.

The advantages in the construction of the bracket E are that it affords a brace for the two handles or shafts C, spacing them properly, and also that by the construction shown and described—that is, a U-shaped bracket having one of its ends provided with a lateral projection for the purpose of adapting it to be more securely fastened to one of the handles and having its other end adapted to receive the reel and serve as a shaft therefor—the simplicity of the parts is preserved, and means are provided for the easy adjustment of a reel upon the carriage and also for the removal of the reel when desired.

The device which I have described is adapted for use in constructing wire fences, telegraph and telephone lines, and the like, and is operated as follows: The spool or bobbin upon which the wire is wound may be itself placed upon the free end of the bracket E, if of suitable size and shape; or if the spool be not of suitable size or shape, or if the wire be not coiled upon a spool, then the wire must be wound upon the reel F by attaching one end of said wire to one of the transverse bars $f$ and the reel caused to revolve upon its shaft by means of its crank-handle. When the wire has been wound upon the reel, the same may be taken off of the shaft for storage or for other purposes, or the device may be used for the laying of said wire along the line of a fence or of telegraph or telephone poles.

I may use the device described either for operation by man, in which case it would be propelled as a wheelbarrow, or by the usual draft-animals, in which case it would be propelled as a sulky or cart.

In the winding of the wire upon the reel, as before described, and in the unwinding of the wire in laying the same it is to be observed that the flaring edges of the disks F' enable the winding and unwinding of the wire to be accomplished without the hitches usual in this class of devices, for the said flaring edges allow sufficient play upon either side without catching in the barbs of the wire or tying the same into knots.

Having thus fully described my invention, what I claim as new, and desire to secure by Letters Patent, is—

1. The combination, with a reel-carriage, of the bracket E, supporting the reel and serving as a journal thereof and of a shape substantially like a U, having one of its ends bent laterally and fastened by means of said laterally-bent end, so as to connect the shafts together, the other end extending above the shafts and forming a journal for the reel, substantially as and for the purpose set forth.

2. In a reel-carriage, the combination, with the U-shaped axle having its ends outwardly turned, wheels mounted on said outwardly-turned ends, and shafts clipped directly to said axle, of the U-shaped bracket E, fastened to and connecting said shafts, said bracket having a free end, upon which is journaled the reel F, and suitable means on the free arm of said bracket for retaining the reel thereon, substantially as and for the purpose set forth.

In testimony that I claim the foregoing as my own I have hereto affixed my signature in presence of two witnesses.

FRANK KROHE.

Witnesses:
 JOHN DEWITT,
 OTIS HOWELL.